Figure 1:
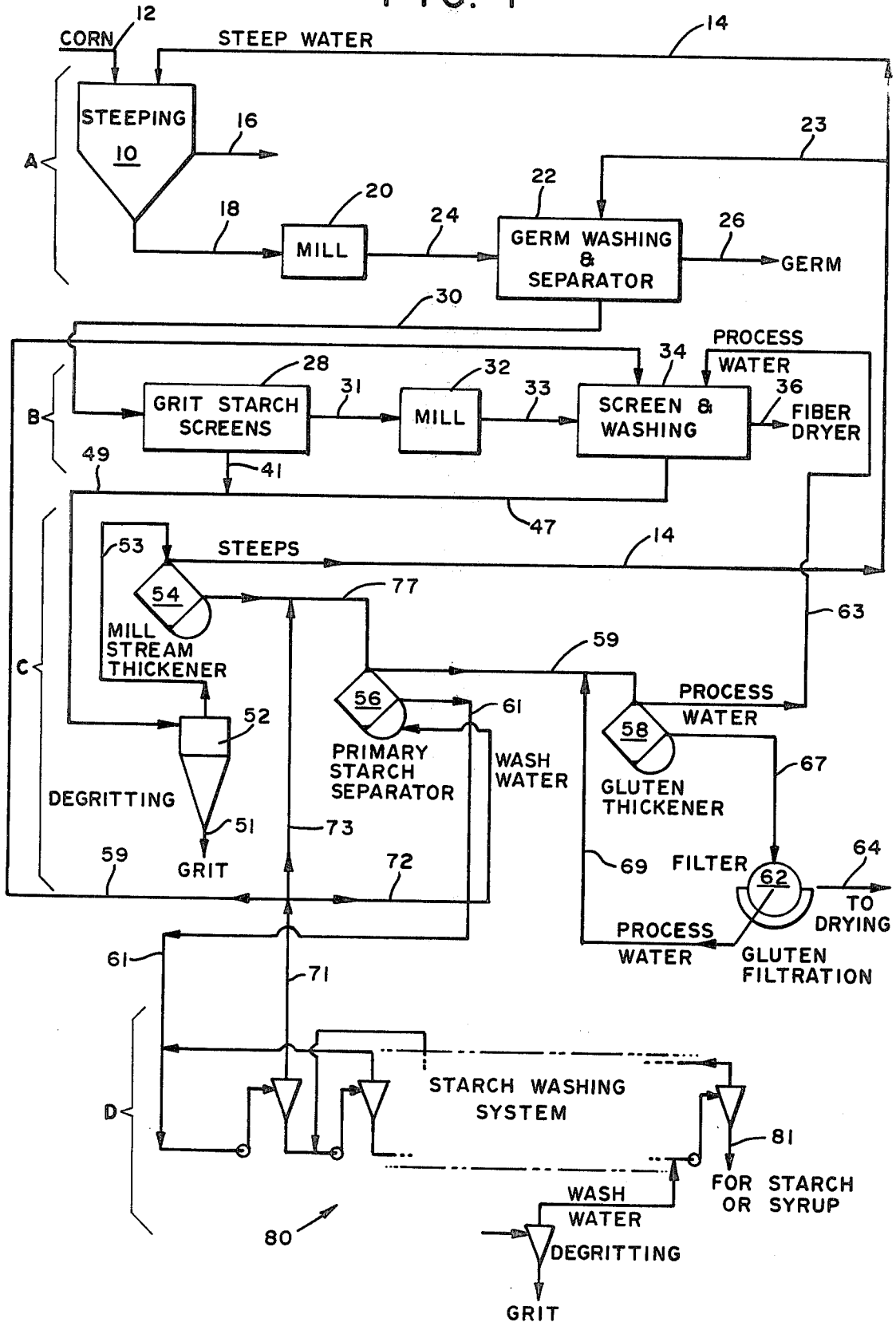

United States Patent [19]

Bonnyay et al.

[11] 4,207,118
[45] Jun. 10, 1980

[54] CORN WET MILLING SYSTEM AND PROCESS FOR MANUFACTURING STARCH

[75] Inventors: Laszlo Bonnyay, Moraga, Calif.; James C. Elsken, Stamford, Conn.

[73] Assignee: Dorr-Oliver Incorporated, Stamford, Conn.

[21] Appl. No.: 970,692

[22] Filed: Dec. 18, 1978

[51] Int. Cl.² .................... C13L 1/02; C13L 1/06
[52] U.S. Cl. .................... 127/24; 127/25; 127/27; 127/68; 127/69
[58] Field of Search .................... 127/67, 68, 71, 24, 127/25, 27

[56] References Cited

U.S. PATENT DOCUMENTS

| | | | |
|---|---|---|---|
| 2,573,048 | 10/1951 | Newkirk | 127/68 |
| 2,698,826 | 1/1955 | Peltzer, Sr. | 127/68 X |
| 2,773,784 | 12/1956 | Williams | 127/68 |
| 3,251,717 | 5/1966 | Honeychurch | 127/68 |
| 3,756,854 | 9/1973 | Hemfort | 127/24 |
| 4,144,087 | 3/1979 | Chwalek | 127/24 |

*Primary Examiner*—Sidney Marantz
*Attorney, Agent, or Firm*—Harold M. Snyder; Burtsell J. Kearns

[57] ABSTRACT

A starch wet milling process, in which a series of independent classifications and separations is carried out in the production of starch, employs a Starch Gluten Separation Station having a three-stage centrifugation treatment including passing the entire mill stream through a mill stream centrifuge thickener, followed by primary starch centrifuge separation and gluten centrifuge thickening.

5 Claims, 3 Drawing Figures

CORN WET MILLING SYSTEM AND PROCESS FOR MANUFACTURING STARCH

This invention is directed to improvements in the manufacture of starch by the wet method and, more particularly, to an improved corn wet milling starch system wherein more effective countercurrent washing is achieved.

The modern process of starch wet milling is a series of independent classifications and separations integrated into a single balanced process. Four treatment stations are required, as follows:
 A. Germ Separation
 B. Fiber Washing
 C. Starch-Gluten Separation
 D. Starch Washing The products of the starch wet milling process are: germ, fiber, gluten, starch and soluble solids. Each of the products reports as the product of its respective station with the exception of the soluble solids, which "fall-out" during steep water evaporation.

Evaporation of the steep water is carried out to obtain the soluble solids therein in the form of a heavy liquor which is mixed with other products of the process, such as fiber, and dried for use as animal feed. Evaporation of the water, of course, requires fuel, and reduction of the amount of fuel consumed in the evaporation of the water is an important consideration. A process which has a lower requirement for water will consume less fuel in the evaporation process.

In the Germ Separation Station the corn kernals are first steeped for softening and then cracked in a mill to release the germ. The germ contains the valuable corn oil and is separated from the magma of starch, hulls and fiber in the overflow of a hydrocyclone stage. The germ is washed in washing screens and then exits the system. The essentially germ-free hydrocyclone underflow reports to the Fiber Washing Station.

The Fiber Washing Station includes a grit starch screening stage in which more than half the free starch is removed as undersize and forwarded to the mill stream thickener in the Starch-Gluten Separation (Centrifugation) Station described below. The oversize from the grit starch screening stage is forwarded to a refining mill and then to a plurality of screen stages arranged for countercurrent washing of the fiber with the starch reporting as undersize to the Starch-Gluten Separation Station. The fiber leaves the system at this point reporting to a centrifuge for dewatering and is subsequently dried.

The Starch-Gluten Separation Station commonly includes a plurality of centrifuges of the disc nozzle type. In this station underflow from the grit starch screens is accepted and the starch is separated from the gluten with the gluten exiting the system. The main starch-bearing stream is forwarded to the Starch Washing Station. Clarified water (free of insoluble solids) is provided by the Starch-Gluten Separation Station for the steeps as is process water (low in solubles) for use in various stages of the system. There is also a recycle stream to the Fiber Washing Station which contains solubles, insolubles and some starch.

The Starch Washing Station is a multiple-stage countercurrent washing system using hydrocyclones which removes solubles together with the remaining insoluble protein and fine fiber in the feed stream as the final starch product is concentrated. The overflow stream from the Starch Washing System has the lowest soluble solids concentration of any stream in the process (except fresh wash water) and is returned to the Starch-Gluten Separation Station as process water. A system of the type described above is outlined in detail in an article entitled "Integrated Starch Wet Milling Process" by Th. H. Bier, J. C. Elsken and R. W. Honeychurch, published in Die Starke 26 Jahrg. 1974/No. 1, Pgs. 23-28.

It is an object of the invention to provide an improved starch wet milling process in which the water requirement is significantly reduced.

Figure 2:
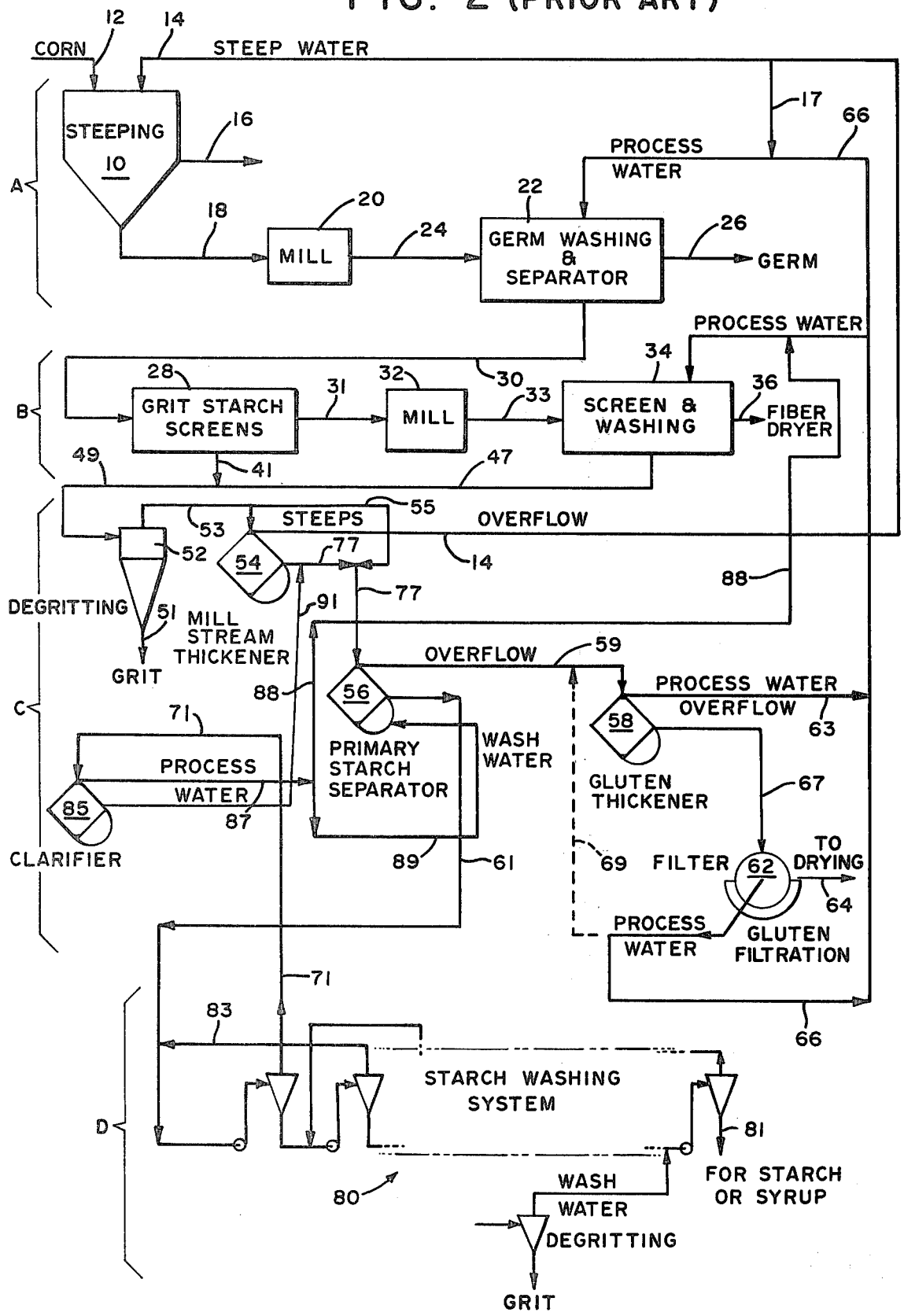
Figure 3:
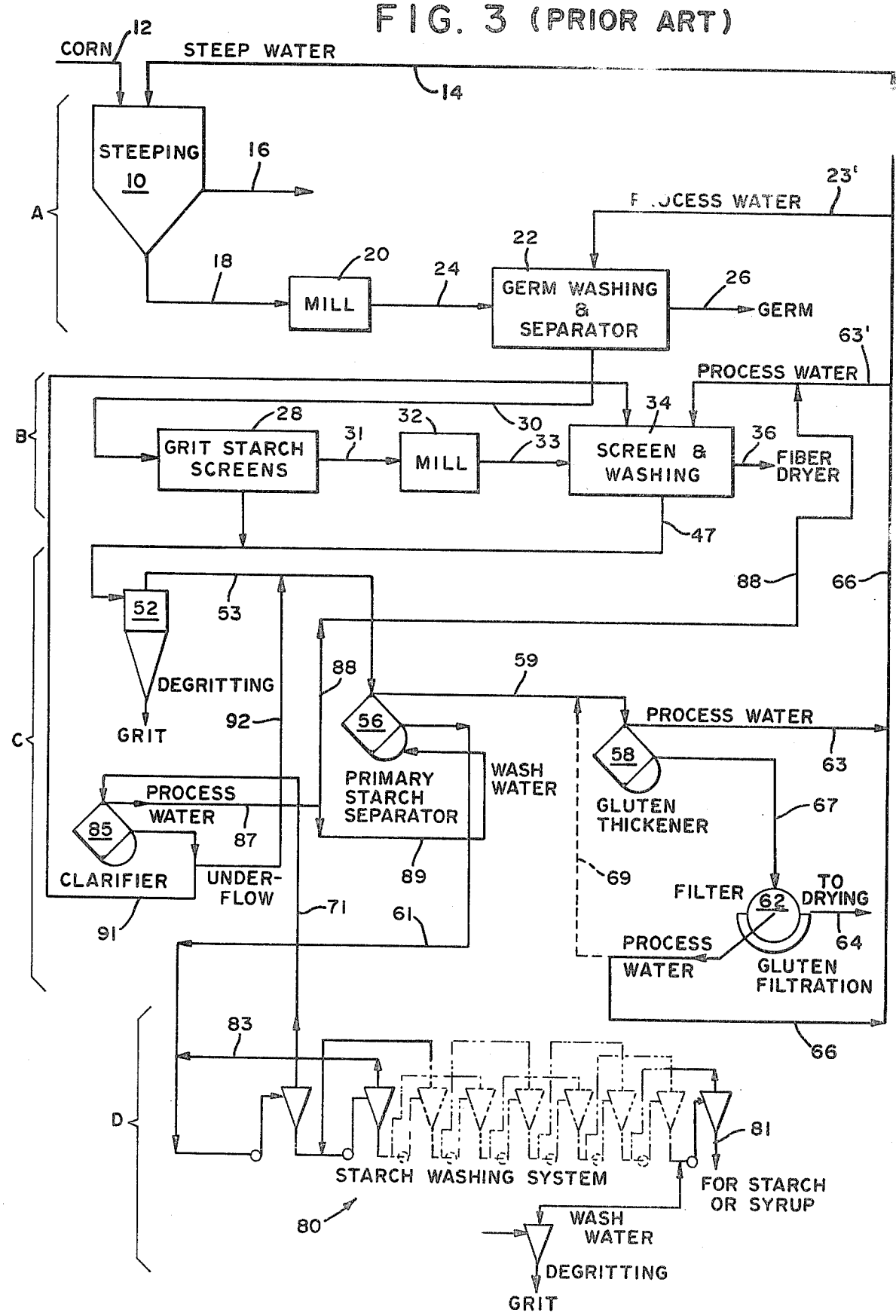

Other objects and advantages of the process will be apparent from the description hereafter and the accompanying drawings in which:

FIG. 1 is a flow diagram of the high density three-stage starch manufacturing process of the invention, FIG. 2 is a flow diagram of a prior art high density four-starch manufacturing process and FIG. 3 is a flow diagram of a prior art low density three-stage starch manufacturing process.

Generally speaking, the present invention is directed to a wet milling starch process employing three-stages of centrifugation in the starch-gluten separation station; i.e., in succession, a mill stream thickener operating to thicken the entire mill stream, a primary starch separator and a gluten thickener, and wherein the overflow of the starch washing system is used in split streams to (1) dilute the underflow of the mill stream thickener, (2) as wash water in the primary starch separator, and (3) as process water in the fiber washing station.

In FIG. 1 the flow diagram represents the starch wet milling process of the invention comprising the Germ Separation Station "A", the Fiber Washing Station "B", the Starch-Gluten Separation Station "C" and the Starch Washing Station "D". The numeral 10 designates one of the tanks of the steeping system which ordinarily consists of a plurality of streeping tanks arranged for countercurrent operation. The shelled corn is fed to tank 10 through line 12 and steeping water or acid is introduced into the steeping tank through line 14, and the steep water is drawn off through conduit 16 and sent to the evaporator (not shown) for recovery of soluble substances. The steeped corn from the tanks 10 is then passed via a conduit 18 to an attrition mill 20 to break up the steeped corn and to free the germ. From the attrition mill 20 the milled steeped corn is passed through conduit 24 to a germ washing and separator stage 22 where the germ is separated and passed by a conduit 26 to a germ processing station (not shown) where it is screened, washed, dewatered, dried and the oil recovered. The underflow from the germ separator stage 22 is conducted via conduit 30 to the grit starch screens 28 where it is screened to remove the starch, commonly called grit starch, released in the milling operation 20. The grit screen tailing from the grit starch screens 28 are conducted via a conduit 31 to Buhr mills 32 or other suitable disintegrators. From the mills 32 the ground grit screen tailings are passed by conduit 33 to a screening and washing station 34 where the starch milk (fibre starch) is separated from the coarse and fine fiber by multistage screening and countercurrent washing. The fibre containing overflow from the screening and washing station is conducted by conduit 36 to a processing station (not shown) for further processing.

Conduit 41, which conducts the grit starch from the grit starch screens 28, joins conduit 47, conducting the fiber starch from the screening and washing stage 34, with the combined flows forming the mill stream in conduit 49 which is forwarded to the degritting hydrocyclone 52. The underflow 51 of hydrocyclone 52 removes grit (sand, etc.) from the stream while the overflow mill stream is conducted through line 53 to the mill stream thickener 54, a centrifuge. The mill stream thickener 54 removes soluble-bearing water from the mill starch, directing it back to the steep tank 10 through conduit 14, and produces a supply of thickened mill starch of controlled concentration which flows to the primary starch separating centrifuges 56 through conduit 77. Some of the soluble-bearing water is directed from conduit 14 into the germ washing and separator stage 22 through line 23. It is an important aspect of this invention that the mill stream thickener stage treats the entire mill stream and concentrates that stream to a specific gravity of 15°–16° Be at 60° F. At this point in the process, then, a large amount of water with high soluble concentration is removed from the stream undergoing processing.

The primary separating centrifuges 56 separate the gluten from the starch. The gluten overflow stream 59 is passed to gluten thickening centrifuges 58. The underflow 67 of centrifuge 58 is forwarded to gluten filters 62 from which the gluten is passed to driers (not shown) through line 64. The overflow from the gluten thickener 58 is returned as process water to the screen and washing stage 34 through line 63 and process water from the gluten filters 62 is routed to conduit 59 for use in gluten thickener 58. The starch underflow stream 61 from centrifuge 56 is passed to a multi-stage hydroycyclone Starch Washing Station remove residual soluble and insoluble protein from the starch. The purified starch issues from the Starch Washing Station through line 81.

The overflow 71 from the Starch Washing Station "D" has a lower soluble solids concentration than any process stream in the Starch-Gluten Separation Station "C" and is routed, in part, through conduit 73 to conduit 77 to dilute the thickened mill stream therein to about 11°–12° Be at 60° F. prior to introduction into the primary starch-gluten separator 56. Thus, the water containing high soluble solids which has been removed by the mill stream thickener 54 is replaced by water low in soluble solids. Other portions of the low soluble solids stream in conduit 71 are routed as wash water to the screen and washing stage 34 and to the primary starch separator 56 through conduits 59 and 72, respectively.

In FIG. 2 a high-density four-stage process in commercial use is illustrated. Where possible, the same reference numerals have been employed as in FIG. 1. This process differs from the process of the invention in employing a clarifying centrifuge stage in addition to the three centrifuge stages previously mentioned; i.e., mill stream thickener, primary starch-gluten separator and gluten thickener. The clarifying centrifuge 85, in this case, receives the overflow from the starch washing station "D" which contains the solubles, some insoluble protein and the starch that is being recycled into the system. A small portion of the overflow from the clarifier 85, the process water lowest in solubles next to fresh water, is used as wash in the primary separator centrifuge 56, moving thereto through conduits 87 and 89, while the balance of the overflow is conducted to the screen and wash station 34 via conduit 88. The mill stream is concentrated in the mill stream thickener centrifuge 54 and the thickened mill stream in conduit 77 is combined with clarifier underflow carried by conduit 91 and with a portion of the mill stream which by-passes the centrifuge in line 55 to constitute the feed to the primary starch separator centrifuge 56. A portion of the mill stream thickener centrifuge overflow is conducted through conduits 14 and 17 to serve as make up water for germ washing in the Germ Separation Station "A". The major portion of the overflow is conducted through conduit 14 to the steeps for steeping. The overflow of the primary separator centrifuge 56, which contains the gluten phase, is conducted through conduit 59 to the gluten thickener centrifuge 58 for concentration of the gluten phase. The starch-rich underflow from the primary starch separator 56 flows through line 61 to the Starch Washing Station "D". The overflow from the gluten thickener centrifuge 58 is passed as wash water through conduits 63 and 66 to the germ washing and separator stage 22 and the underflow proceeds to the gluten filter station 62 through line 67. Process water from the gluten filter 62 is returned to the germ washing and separator stage 22 as wash water and, optionally, a portion of this water may be diverted to conduit 59 through conduit 69 for use as process water in gluten thickener 58. The product starch exits the starch washing system "D" through line 81.

In FIG. 3, a low-density three-stage centrifugation process in commercial use is illustrated, and again, the same reference numerals are employed, where possible, as in FIGS. 1 and 2. This process employs only three centrifuge stages, and routes the mill stream directly from the degritting hydrocyclone 52 to the primary starch-gluten separator 56, thereby eliminating the mill stream thickener centrifuge. The overflow from the Starch Washing Station "D" is conducted through line 71 for clarification in centrifuge 85. A small portion of the overflow clarified water leaving the centrifuge 85 is routed through conduits 87 and 89 for use as wash water in the primary starch separator centrifuge 56, and the major portion of the clarified water is forwarded by way of conduits 88 and 63' to the fiber screen and washing station 34 for use as wash water. The underflow of clarifier centrifuge 85 is, in part, permitted to flow through lines 91 and 92 to combine with the unthickened mill stream flowing in line 53 and this combined flow constitutes the feed to the primary starch separator centrifuge 56. The balance of the flow in line 91 is routed to the fiber screen and washing station 34. The overflow from the primary starch separator centrifuge 56 containing the gluten phase is conducted through conduit 59 to the gluten thickener centrifuge 58 where it is clarified and the gluten concentrated. A portion of the primary separator centrifuge overflow is added to the fiber and germ wash systems as process water through conduits 63, 66, 63' and 23' and the balance is forwarded to the steeps through conduits 63, 66 and 14. As in the previous processes the starch-rich underflow leaves the primary starch separator 56 and is conducted to the starch washing system "D" through line 61. The starch product exits the system through line 81.

The process of the present invention illustrated in FIG. 1 has the very real advantage over the prior art process of FIG. 2 in that it requires only three stages of centrifugation rather than four stages. there is thus an immediate and substantial saving in capital cost when the process of the present invention is selected over the prior art process of FIG. 2.

Another advantage of the process of the invention over both of the prior art processes is the lower consumption of fresh water.

A comparison of the prior art systems with the system of this invention is carried out under conditions such that washed starch of equal purity is obtained in each case. Under these conditions the quantity of wash water and thus the quantity of steep water to be evaporated will be different in each case. At a typical or acceptable level, 0.04% soluble solids may be present in the washed starch obtained in a ten-stage starch washing system. Thus, in a system producing 775.35 lb/min starch, the starch will contain 0.04% of that amount; i.e., 0.31 lb/min, of soluble solids.

In the high density four stage system of FIG. 2 the feed to the Mill Stream Thickener Centrifuge 54 from the Fiber Washing Station "B" contains 177.73 lbs/min of solubles while the discharge from the Primary Starch Separator 56, i.e., the feed to the Starch Washing System "D" contains 64.58 lbs/min of solubles. Thus, the reduction in solubles content across the Starch-Gluten Separation Station "C" is $$\frac{177.73 \text{ lbs/min}}{64.58 \text{ lbs/min}}$$

or 2.75 fold.

In the low density 3-stage system of FIG. 3, the feed from the Fiber Washing Station "B" to the Primary Starch Separator centrifuge station 56 contains 175.79 lbs/min of soluble solids. The discharge from the centrifuge station 56 to the Starch Washing System "D" is the same as in the previous cases; i.e., 64.58 lbs/min of solubles. The reduction in solubles across the centrifuge station is calculated in the same manner as before and a value of $$\frac{175.79 \text{ lbs/min}}{64.58 \text{ lbs/min}}$$

or 2.72 fold, is obtained.

Finally, in the high density 3-stage system of the invention illustrated in FIG. 1, the feed to the Mill Stream Thickener centrifuge station 54 from the Fiber Washing Station "B" contains 231.97 lbs/min of solubles. The discharge from the Primary Starch Separator centrifuge station 56 is the same as in the previous instance; that is, 64.58 lbs/min of solubles. The reduction in solubles content across the centrifuge station for this system is therefore $$\frac{231.97 \text{ lbs/min}}{64.58 \text{ lbs/min}},$$

that is, 3.59 fold.

It is evident that the high density three-stage system of the invention has the highest reduction in solubles, being 1.305 times better than the conventional high density four-stage system and 1.320 times better than the low density three-stage system. This improved solubles reduction effected by the centrifuge station of the high density three-stage system allows a substantial reduction in the amount of wash water which must be introduced in Starch Washing System "D". Since most of the water in the system is ultimately driven off by evaporation of the steeps, a reduction in the amount of added water makes possible a reduction in the amount of fuel required for evaporation of the steeps.

The high density four-stage system of FIG. 2 will require 2.55 pounds of water per pound of starch produced. The low density three-stage system of FIG. 3 will require 2.555 pounds of water per pound of starch produced. The high density three-stage system of the present invention will require only 2.47 pounds of wash water per pound of starch produced. The net savings in water which water can be effected by using the high density three-stage system are thus 0.08 pound water per pound of starch compared with the high density four-stage system and 0.085 pound water per pound of starch in the case of the low density three-stage system.

As an exemplary situation, with a grind rate of 35,000 bushels of corn per day and a starch recovery of 31.9 pounds per bushel, using coal priced at $30 per ton and having a heat value of 14,000 BTU per pound, annual fuel savings of $19,209 and $19,938, respectively, are realized when the system of the invention (FIG. 1) is employed rather than the high density four-stage system (FIG. 2) or the low density three-stage system (FIG. 3) of the prior art.

Although the present invention has been described in conjunction with preferred embodiments, it is to be understood that modifications and variations to be resorted to without departing from the spirit and scope of the invention as those skilled in the art will readily understand. Such modifications and variations are considered to be within the purview and scope of the invention and appended claims.

We claim:

1. The process of manufacturing starch from grain wherein the grain is steeped and comminuted and then subjected successively to a wet germ separation step and a fiber washing step to yield a mill starch stream and a fiber stream, at least a part of the mill starch stream being concentrated by centrifugal action yielding an overflow stream which is routed in part as wash to the germ separation step with the balance of flow going to the steeps as steep water, the concentrated mill starch stream being supplied to a primary starch separator centrifuge for separation by centrifugation into a gluten-containing stream and a concentrated starch-rich stream, with the starch-rich stream being supplied to a starch washing station, the gluten-containing stream being subjected to centrifugation to produce a gluten product, the starch washing station producing a relatively pure starch product stream and an overflow stream having a low soluble solids content, the improvement comprising subjecting the entire mill starch stream to centrifugation for thickening, diluting the concentrated mill starch stream with a first portion of the overflow stream from the starch washing station, conducting a second portion of said overflow stream to said primary starch separator centrifuge for use as a wash therein and conducting a third portion of said overflow stream to said fiber washing step as wash water therefor.

2. The process of claim 1 wherein the concentrated mill starch stream has a specific gravity of 15° to 16° Be at 60° F.

3. The process of claim 2 wherein the concentrated mill starch stream is diluted by said first portion of the overflow stream stream to a specific gravity of 11° to 12° Be at 60° F.

4. A corn wet milling system for manufacturing starch comprising a germ separation station, a fiber washing station, a starch-gluten separation station and a starch washing station for successively treating a product stream, the starch-gluten separation station comprising (1) a mill stream thickener centrifuge with a first conduit connecting said fiber washing station with said mill stream thickener centrifuge for conducting the entire mill stream to said thickener centrifuge, (2) a primary starch separator centrifuge for separating starch from gluten with a second conduit connecting said thickener centrifuge with said separator centrifuge to conduct the thickened mill stream from said thickener centrifuge to said separator centrifuge, conduit means for passing a starch-rich product stream to said starch washing station, and (3) a gluten thickener centrifuge adapted to receive the gluten-containing product stream of said primary starch separator centrifuge, a dilution water conduit conducting at least a portion of the low-solubles overflow of said starch washing station to said primary starch separator to dilute the thickened mill stream feed, a third conduit conducting a second portion of said low-solubles overflow to said fiber washing station as wash water therefor and a fourth conduit conducting a third portion of said low solubles overflow to said primary starch separator as wash water.

5. The corn wet milling system of claim 4 wherein said dilution water conduit is connected to said second conduit to effect dilution of the mill stream feed therein.

* * * * *